(12) United States Patent
Nonnast et al.

(10) Patent No.: US 7,137,918 B2
(45) Date of Patent: Nov. 21, 2006

(54) RIBBED V-BELT AND METHOD OF MAKING THE SAME

(75) Inventors: Tobias Nonnast, Hannover (DE); Kay Zimmermann, Garbsen (DE); Ymte Greydanus, Barsinghausen (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 448 days.

(21) Appl. No.: 10/656,289

(22) Filed: Sep. 8, 2003

(65) Prior Publication Data

US 2004/0048708 A1 Mar. 11, 2004

(30) Foreign Application Priority Data

Sep. 7, 2002 (EP) ................................. 02020121

(51) Int. Cl.
*F16G 1/08* (2006.01)
*F16G 5/20* (2006.01)

(52) U.S. Cl. .................. 474/260; 474/263; 156/137

(58) Field of Classification Search ........ 474/260–266, 474/268, 271, 237–239; 156/137–139
See application file for complete search history.

(56) References Cited

U.S. PATENT DOCUMENTS

| | | | | |
|---|---|---|---|---|
| 3,090,716 A | * | 5/1963 | Stevens | 474/260 |
| 3,190,137 A | * | 6/1965 | Adams, Jr. | 474/238 |
| 3,799,824 A | * | 3/1974 | Arnao et al. | 156/139 |
| 3,839,116 A | * | 10/1974 | Thomas et al. | 156/138 |
| 4,027,545 A | * | 6/1977 | White, Jr. | 474/252 |
| 4,047,446 A | * | 9/1977 | Speer | 474/238 |
| 4,657,526 A | | 4/1987 | Tangorra et al. | |
| 4,892,510 A | * | 1/1990 | Matsuoka et al. | 474/252 |
| 6,561,937 B1 | * | 5/2003 | Wegele | 474/263 |
| 6,669,592 B1 | * | 12/2003 | Hayashi | 474/268 |
| 2003/0139242 A1 | | 7/2003 | Teves et al. | |

FOREIGN PATENT DOCUMENTS

| | | | | |
|---|---|---|---|---|
| DE | 4318454 | | 2/1995 | |
| EP | 0662571 A1 | * | 7/1995 | |
| JP | (56-63150 A | * | 5/1981 | 474/90 |

* cited by examiner

*Primary Examiner*—Marcus Charles
(74) *Attorney, Agent, or Firm*—Walter Ottesen

(57) ABSTRACT

The invention relates to a ribbed V-belt having an elastomeric cover layer (1), a tension-support layer (3) and an elastomeric base body (2). The base body (2) has ribs which have an outer coating containing polymers and fibers and is fixedly joined to the base body. The outer coating is an elastomeric layer having a layer thickness of 0.15 to 0.25 mm. The elastomeric layer is based on an interlaced rubber and contains at least fibers (5) in combination with a fluoropolymer powder (6) and/or a powder of non-ferrous metal. The invention also relates to a method of making the ribbed V-belt.

17 Claims, 3 Drawing Sheets

RIBBED V-BELT AND METHOD OF MAKING THE SAME

CROSS REFERENCE TO RELATED APPLICATION

This application claims priority of European patent application no. 02020121.6, filed Sept. 7, 2002, the entire content of which is incorporated herein by reference.

FIELD OF THE INVENTION

The invention relates to a toothed or ribbed V-belt having an elastomeric cover layer, a tension-support layer and an elastomeric base body which has ribs or teeth. The ribs have an outer coating containing polymer and fibers fixedly bonded to the base body. The invention also relates to a method for making the ribbed V-belt.

BACKGROUND OF THE INVENTION

Ribbed V-belts function, for example, for transmitting force in areas of use which include office machines to the heaviest machine drives. Ribbed V-belts are also used in motor vehicles in different configurations. During use, the ribbed V-Belts are subjected to the most different operating conditions. High requirements are imposed with respect to resistance to wear, noise and dynamic loading. The belts should have the longest possible service life and, at the same time, reduced running noise especially in the area of motor vehicles and household products. Noises arise in frictionally-engaged drive belts such as ribbed V-belts because of friction conditions between drive discs and the belt surface which cause squeaking sounds because of oscillation or vibration.

To reduce the development of noise in frictionally-engaged drive belts and at the same time to improve resistance to wear, United States patent application publication 2003/0139242 A1 discloses a belt which has an outer coating containing polymer on parts of its surface, for example, on the rib surface in ribbed V-belts. This coating is bonded and/or interlaced or cross linked with the rubber or rubber-like plastic of the base body via a vulcanization process. Furthermore, the belt has a flocking material of aramide fibers on its surface of which a portion is bound into this layer only with a partial length. The polymer-containing outer coating is applied as a solution or in liquid form and operates as an adhesive for the fibers during the flocking operation. The coating can be, for example, a rubber solution, a urethane system or a system on the basis of cyanic acrylate in organic solution. The outer coating can additionally contain fluoropolymers. Ribbed V-belts having a coating of this kind are manufactured with the aid of a time-intensive and personnel intensive flocking method. First, the polymer-containing outer layer must be applied to the blank via spraying, coating or dipping. A coating of this kind, as a rule, has a layer thickness of only 50 µm. Thereafter, the flocking takes place with which there is often a high loss of flocking material because of material which does not adhere. Thereafter, and when using coating solutions containing solvents, the blank must be vented in advance of vulcanization over long time spans to remove the solvent because residual amounts of solvent can lead to hollow spaces and inhomogeneities in the product during the vulcanization. However, even after venting and the vulcanization, certain quantities of solvent can remain in the product which evaporate in the course of the product's service life. Also because of this later evaporation of residual solvent, the characteristics of the product can deteriorate. Thus, the volume, for example, of the rubber body decreases after complete evaporation of the solvent and the stability as to form and the physical characteristics can change thereby afterwards which must be considered especially for products subjected to high load. In addition, an odor can occur because of the escaping residual solvent. One considers the above-mentioned aspects in that the rubber product is stored for some time in advance of a test or check and in advance of use. In this way, one must maintain a large inventory which is not wanted for economic reasons. If the flocking fibers are rubbed off in the course of belt use, the layer (approximately 50 µm), which contains the polymer, hardly offers protection against wear.

German Patent 4,318,454 discloses rubber-toothed belts made of elastomeric material which have a high resistance to wear and a long service life and are manufactured with reduced technical complexity. In order to achieve this, the outer surfaces of the teeth have a coating which is made of a fiber-reinforced polymer material, for example, an elastomer having a 10% to 80% fiber concentration per polymer component with the fiber concentration of the elastomer being greater than in the remaining elastomer base body. There is nothing stated in German patent publication 4,318,454 as to the thickness of the coating. A coating of this kind often does not provide the wanted results in ribbed V-belts with respect to noise performance.

U.S. Pat. No. 4,657,526 discloses V-belts having a high transverse stiffness and longitudinal flexibility. The belt body of these V-belts is built up completely of individual elastomeric layers wherein fibers are arranged oriented in one direction in each case. The thickness of each layer is less or equal to the average length of the fibers present in the layer. The fiber concentration in the layers cannot be selected to be very high because the elastic characteristics of the belt body would deteriorate. The resistance to wear and the noise performance of such belts is not adequate for many areas of use.

SUMMARY OF THE INVENTION

It is an object of the invention to provide a ribbed V-belt which can be simply and economically manufactured and which has good or improved resistance to wear and has a good or improved noise performance while simultaneously exhibiting good dynamic loadability. It is also an object of the invention to provide a method for simply and economically making such a ribbed V-belt.

The ribbed V-belt of the invention includes: an elastomeric base body having a first side defining a plurality of ribs and a second side facing away from the first side; an elastomeric cover layer; a tension support layer interposed between the cover layer and the second side; the ribs having an outer coating thereon containing polymer and fibers and being tightly joined to the base body; the outer coating being an elastomeric layer having a layer thickness of 0.15 to 0.25 mm; and, the elastomeric layer being based on an interlaced rubber and containing at least fibers in combination with fluoropolymer powder and/or powder of a non-ferrous metal.

Accordingly, the outer coating can contain fluoropolymer powder or powder of a non-ferrous metal or both.

The method of making the ribbed V-belt of the invention includes the steps of: producing a vulcanizable rubber mixture for the outer coating of the ribs of the ribbed V-belt, the rubber mixture including at least a rubber, vulcanization chemicals, fibers and at least a powder selected from fluoropolymer powder and powder of a non-ferrous metal; calendering the rubber mixture for the outer coating to a web having a layer thickness of 0.15 to 0.25 mm; applying the web to the side of a rubber mixture plate for the base body or to a belt blank, the side forming the ribs in the manufactured belt, the base body already having at least the rubber mixture plate for the cover layer, the tension support layer and the rubber mixture plate for the base body; vulcanizing the belt blank; and, cutting the ribbed V-belt.

A ribbed V-belt of this kind can be easily and economically manufactured in that a rubber mixture with fibers in combination with a fluoropolymer powder and/or a powder of a non-ferrous metal is applied to the blank and this layer is cross linked to the elastomer during the vulcanization of the blank. A good interlinkage between the base body and the outer coating is ensured. Complex pre-treatment steps such as providing the blank with an adhesive solution and a flocking material with large quantities of high-value waste do not take place. Solvents are not used and venting time is not necessary. The rubber mixture webs for the outer coating can be centrally manufactured and transported in rolled bales and stored.

In the elastomeric layer, fibers as well as fluoropolymer powder and/or powder of a non-ferrous metal must be contained because only in this way is a clear improvement in the characteristics of noise and/or wear achievable in a surprising manner.

At the same time, the layer thickness of the elastomeric layer must lie between 0.15 and 0.25 mm in order to obtain belts having a high flexibility in operation and a long service life. For layer thicknesses of more than 0.25 mm, negative effects can occur in the forming of the rib profile due to the fiber-filled mixture because the flowability of the fiber-filled mixture is limited. Rounded rib heads, ribs which are too flat, fissures in the elastomeric layer or uncoated missed locations can occur. If the layer thickness is less than 0.15 mm, the processing is affected and damage to the rubber web can easily occur when cutting the same into lengths and applying it to the blank.

The layer thickness preferably is 0.18 to 0.22 mm. A layer of this thickness ensures an adequate fiber quantity at the rib surface over the entire service life of the ribbed V-belt. Fibers which separate from the layer because of the occurring friction forces during use of the belt can be replaced by the fibers lying therebeneath.

According to an advantageous embodiment of the invention, the fiber component in the outer layer is 20 to 100 parts by weight per 100 parts by weight of rubber and especially preferred is that the fiber component is 40 to 85 parts by weight. With such fiber components, one obtains the best results with respect to service life. When there are larger amounts of fiber components, the rubber mixture becomes brittle and dry and this leads to a poor bonding of the outer layer to the base body or even to the situation that the mixture cannot be calendered to a closed rubber web. At low fiber components, the wear characteristics and noise performance of the belt are not adequate.

As fibers for the outer coating, the most various fibers of different materials and different lengths and fiber diameters can be used. Here, the fibers can, for example, be of aramides (for example, para-aramide and meta-aramide), polyacrylonitrile, polyester or fibers on the basis of melamine resin. Especially preferable are, however, fibers of polyimide.

Fibers of polyimide have an inert and smooth surface and therefore make possible an optimization of the coefficient of friction which contributes to the condition that, when starting the movement of the belt (for example, when starting the motor), at first a slight slippage is permitted on the drive discs so that noise can be suppressed. Furthermore, the smooth surface provides for good processing of the mixture also for high fiber components. Polyimide fibers are preferably utilized in quantities of 50 to 85 parts by weight per 100 parts by weight of rubber. Polyimide fibers are available with a large specific surface which effects an especially tight anchoring of the fibers in the polymer layer.

The outer coating can also contain several different types of fibers.

The fibers can have a length of 0.1 to 6 mm. For synthetic fibers, the diameters of the fibers can be 4 to 100 μm and for natural fibers the diameters can be 6 to 50 μm. Milled flocking material as well as cut fibers (cut flocking materials) can be used. The use of pulp or fiber granulate is also possible.

If a fluoropolymer powder is present in the outer layer, then the preferred component of fluoropolymer powder in the outer layer is 10 to 100 parts by weight per 100 parts by weight of rubber. With these components, especially good results are obtained with respect to wear and noise performance. Especially preferred are more than 50 parts per weight of fluoropolymer powder per 100 parts by weight of rubber. It was surprisingly determined that, notwithstanding the usually poor binding of fluoropolymers to rubber and the high components to fluoropolymer powder, no significant loss of fluoropolymer powder in the coating during operation was noticed (presumably because of an interrelationship with the fibers in the outer layer of the invention).

According to an advantageous embodiment of the invention, the particles of the fluoropolymer powder have an average grain diameter of 2 to 20 μm, a BET-surface of 5 to 25 $m^2/g$ and a bulk weight or powder density of 100 to 400 g/L. With particles having these characteristics, one obtains mixtures which can be well processed and which lead to good characteristics on the ribbed V-belts. A large BET-surface improves the anchoring in the elastomeric matrix.

According to a preferred embodiment, a powder of polytetrafluoroethylene (PTFE) can be used as a fluoropolymer powder, for example, a PTFE micropowder having an average grain diameter of 4 μm, a BET-surface of 17 $m^2/g$ and a bulk weight or powder density of 280 g/L. Also, for example, copolymers or terpolymers such as ethylene-tetrafluoroethylene-copolymers or tetrofluoroethylene-hexafluoropropylene-vinylidene fluoride-terpolymers can be used. Such polymers are, for example, available commercially under the trade name Dyneon THV® of Dyneon GmbH, a corporation doing business in Germany. Also, combinations of different fluoropolymer powders can be used.

If a powder of a non-ferrous metal is contained in the outer coating, then its component in the outer coating is preferably 50 to 100 parts by weight per 100 parts by weight of rubber. With these components of powder of a non-ferrous metal, an especially good reduction of noise is obtained.

The outer coating can contain fluoropolymer powder or a powder of a non-ferrous metal or both. If both are contained synergistic effects with respect to noise performance and wear performance occur.

The particles of the powder of a non-ferrous metal can be ball-shaped, platelet-shaped or star-shaped and have a mean particle diameter of 10 to 80 μm. Particles of this kind can be mixed well into the rubber mixture for the outer coating and are not so easily rubbed off during operation.

Non-ferrous metal is a generic characterization for non-alloyed metals with the exception of iron and for alloys in which a metal except iron has the greatest component with respect to mass. Powders of these non-ferrous metals can be used. Preferably, however, copper powder can be used. It has been shown that with copper powder, an especially good noise performance can be obtained. For example, a copper powder can be used having a grain diameter of less than 63 µm.

According to a preferred embodiment of the invention, the outer coating is based on the same type of rubber or the same types of rubber as the elastomeric base body. In this way, an optimal bonding of the outer layer to the base body can be achieved. The outer coating and the base body can, for example, be based on chloroprene rubber (CR), ethylene-propylene diene rubber (EPDM), hydrated nitrile rubber (HNBR) or mixtures thereof.

It is possible that the outer coating can be different from the base body with respect to color. This embodiment affords the advantage that the outer coating can function as a wear indicator. When the base body of different color can be seen through the outer coating, the belt has to be exchanged. For generating outer coatings of another color, a color pigment or a light filler can be admixed to the rubber mixture for the outer coating when the base body, for example, is based on a soot-filled black mixture.

In the method for making the ribbed V-belt, it has been shown advantageous that the vulcanizable rubber mixture for the outer coating of the ribs of the ribbed V-belt contain a processing assist agent to increase the coarse consistency and/or to adjust a desired thixotropic degree of the mixture. The fiber component in the mixture can be increased in this manner without the mixture becoming too brittle and dry for the processing.

As a processing assist agent, for example, a microfiber or a mixture compatible thixotropic agent can be used which, for example, greatly increases the coarse consistency and, in this way, facilitates the forming process of a thin web and which melts in the vulcanization process and is integrated into the rubber matrix.

In the method for making the ribbed V-belt, it is advantageous when the web for the outer coating is fixed on the rubber mixture plate for the base body or on the belt blank via a contact pressing operation. Defects in the product can be avoided in this way. The fixing can, for example, take place with a soft roller and can be controlled via the pressing force and the pressure dwell time.

At least a part of the fibers lying at the surface in the outer coating on the ribs can be raised after vulcanization by a brushing operation. After the vulcanization, the formed rib surface is smooth and fibers hardly stand out from the surface. With the brushing operation, fiber ends are exposed which positively influence the noise and wear. The surface is quasi activated. The same effect can, however, also be achieved when the belt is run over different rollers for some time in the drive aggregate.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
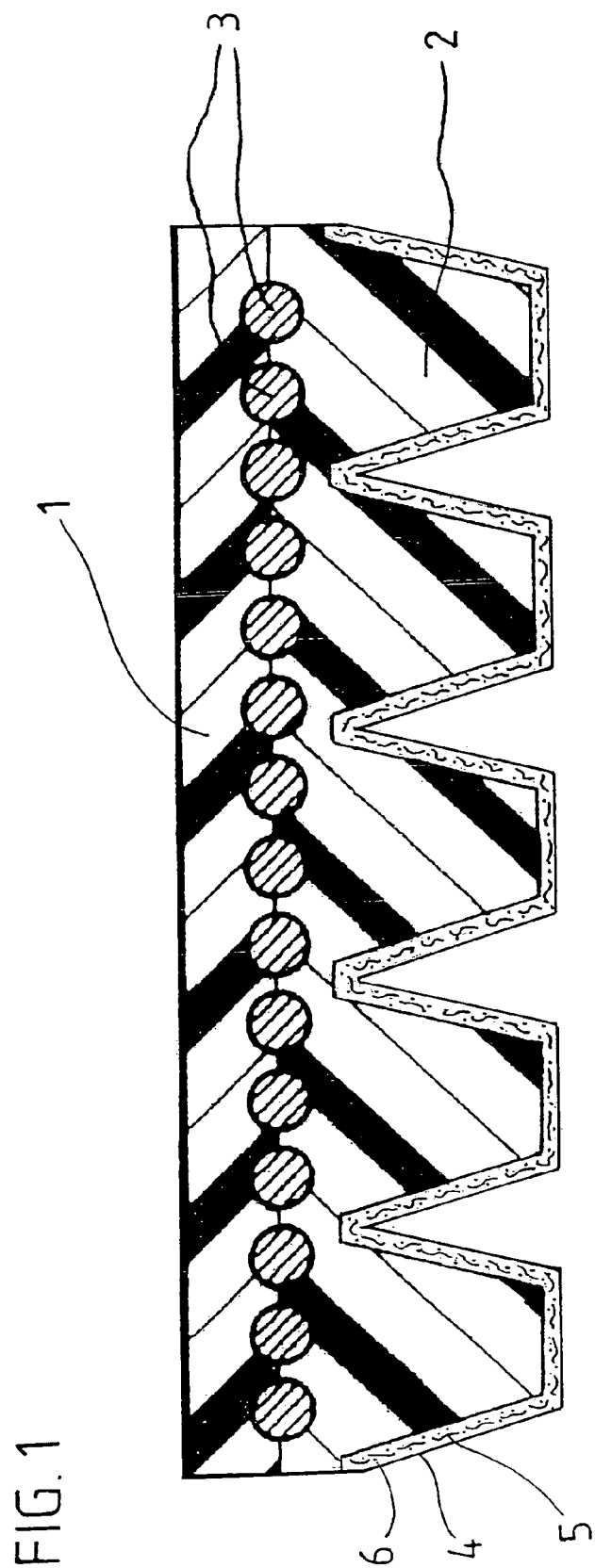
FIG. 1 shows a cross section of a ribbed V-belt according to the invention.

FIG. 1 shows the ribbed V-belt according to an embodiment of the invention. The ribbed V-belt includes an elastomeric cover layer 1, an elastomeric base body 2 and a tension support or reinforcement layer 3 disposed therebetween. An outer coating 4 is disposed on the ribs of the ribbed V-belt and the coating includes fibers 5 in combination with fluoropolymer powder 6.

Figure 2:
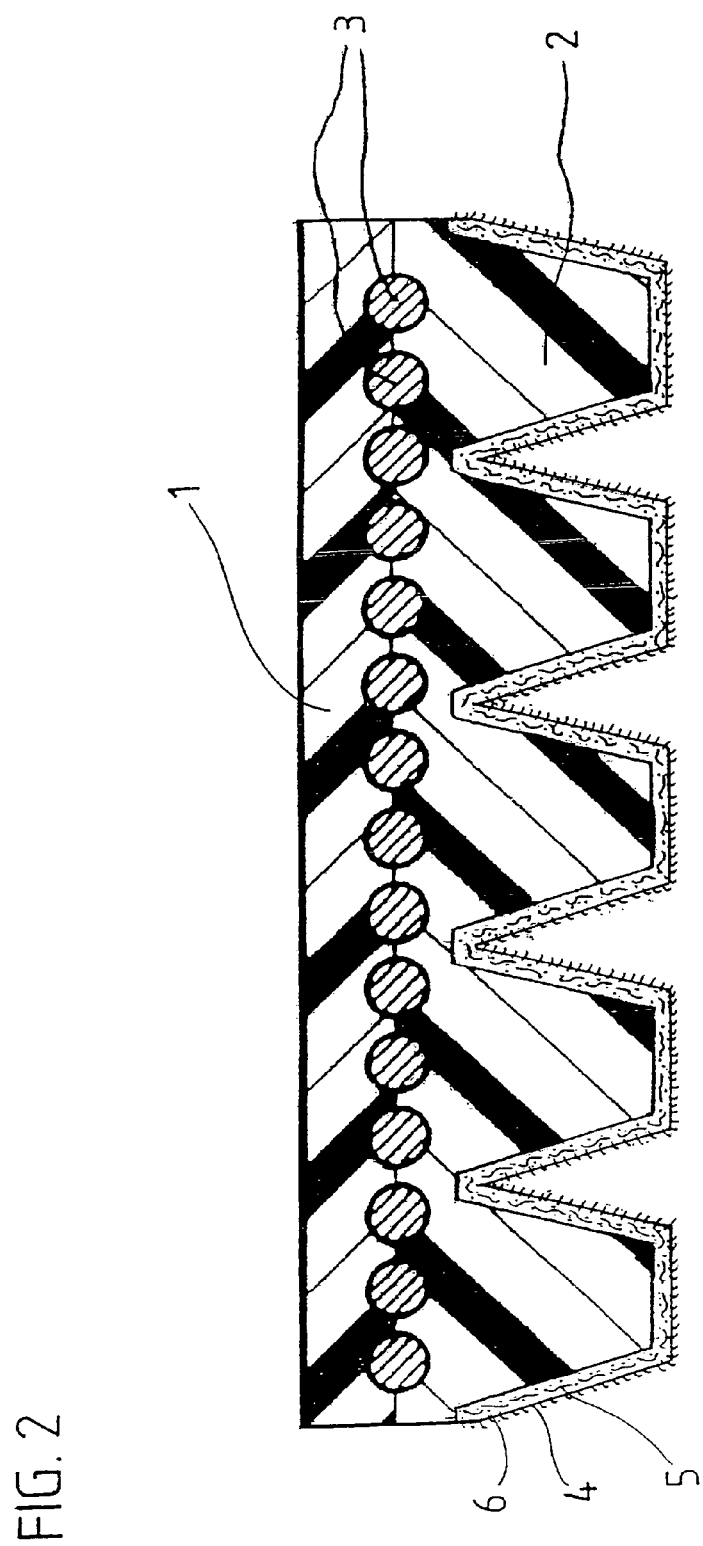
In FIG. 2, the same ribbed V-belt is shown after a brushing operation wherein a portion of the fibers 5 lying on the surface in the outer coating 4 is raised on the ribs.

In FIG. 2, the same ribbed V-belt 1 is shown after a brushing operation wherein a portion of the fibers 5 lying on the surface in the outer coating 4 is raised on the ribs.

Figure 3:
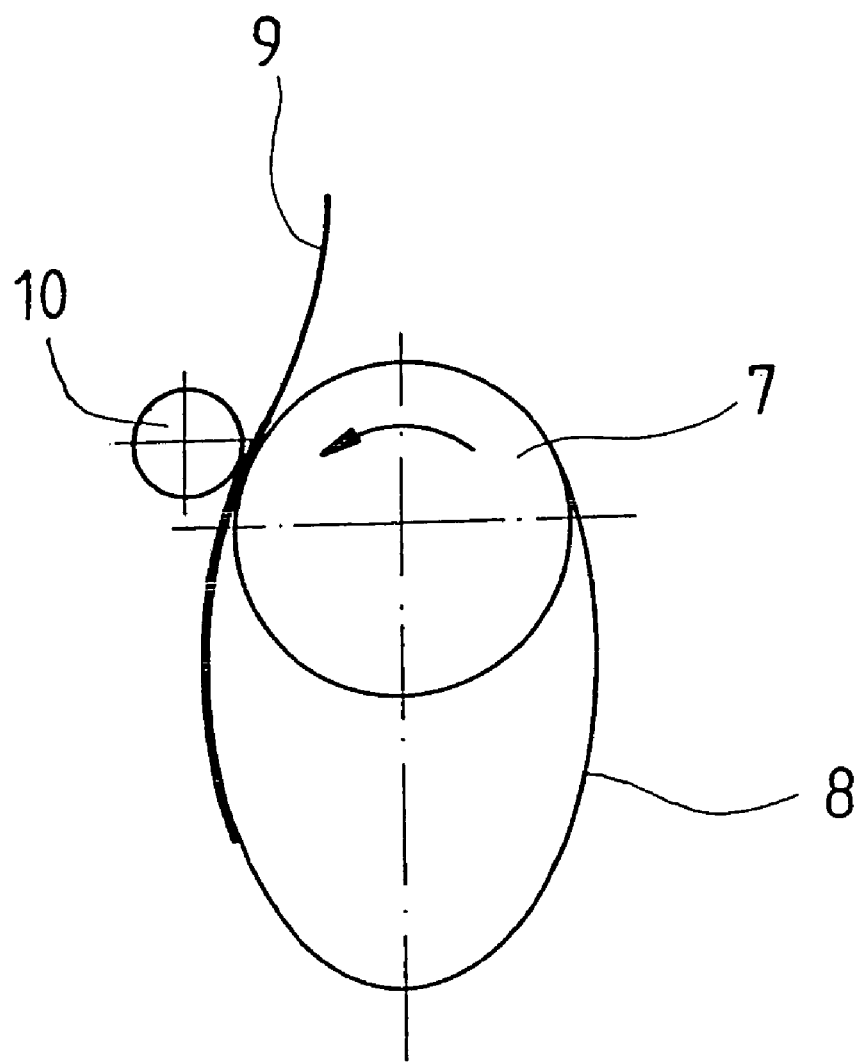
FIG. 3 shows the application of the web for the outer coating to a belt blank.

FIG. 3 shows a belt blank 8 rotated on a drum 7 with the blank 8 already containing the rubber mixture plates for the cover layer and the base body as well as the tension support layer. Also shown in FIG. 3 is how a web 9 from a calendered rubber mixture is applied for the outer coating with a layer thickness of 0.15 to 0.25 mm. A contact-press roller 10 fixes the web 9 on the belt blank 8.

For the outer coating, an elastomeric layer of the following mixture can, for example, be used:

| | |
|---|---|
| 100 parts by weight | EPDM |
| 90 parts by weight | Aramide fibers and/or polyimide fibers |
| 50 parts by weight | PTFE powder |
| 10 parts by weight | activators |
| 15 parts by weight | filler materials |
| 7 parts by weight | interlacer |
| 10 parts by weight | acrylate |
| 10 parts by weight | adhesion activator |
| 1 part by weight | softener |
| 5 parts by weight | stearic acid |
| 10 parts by weight | processing assist agent. |

The mixture is mixed in conventional mixing apparatus and, thereafter, is calendered to a web having a layer thickness of approximately 0.2 mm and is then applied to the belt blank, for example, with the aid of the arrangement shown in FIG. 3. Thereafter, vulcanization takes place and the wrap is cut into ribbed V-belts of the desired width.

Table 1 shows the results of noise and wear tests in testing devices with the ribbed V-belts. The belts differ only in the aggregates for the composition of the elastomeric layer which forms the outer coating on the belt ribs. In the table, the rating is as follows: satisfactory=o, good=+, and very good=++.

TABLE 1

| Aggregates | Noise | Wear |
|---|---|---|
| Aramide flocking material | + | o |
| Polyimide fiber | + | + |
| PTFE-powder | + | + |
| Copper powder | + | + |
| Aramide flocking material and PTFE-powder | + | ++ |
| Polyimide fibers and PTFE-powder | ++ | ++ |
| Polyimide fibers and copper powder | ++ | + |
| Polyimide fibers and PTFE-powder and copper powder | ++ | ++ |

For the purpose of comparison, noise and wear tests were carried out with a belt on which a polyurethane system in the form of a solution was applied and which thereafter was flocked with aramide fibers in accordance with the teachings of United States patent application publication 2003/0139242 A1 incorporated herein by reference.

TABLE 2

| Flocked Belt | Noise | Wear |
|---|---|---|
| Polyurethane coating and aramide flocking material | + | ○ |

From Table 1, it can be seen that the noise performance and/or the wear performance compared to belts which have an outer coating of only fiber or only PTFE-powder or only copper powder can be improved with the presence of fibers in combination with PTFE-powder and/or copper powder. A comparison to belts having a polyurethane coating and subsequent flocked fibers shows that the belt of the invention is improved with respect to noise and wear performance compared to these belts.

The subject matter of European patent application 020 20 121.6, filed on Sep. 7, 2002 and on which the claim of priority is based herein, is incorporated by reference.

It is understood that the foregoing description is that of the preferred embodiments of the invention and that various changes and modifications may be made thereto without departing from the spirit and scope of the invention as defined in the appended claims.

What is claimed is:

1. A ribbed V-belt comprising:
an elastomeric base body having a first side defining a plurality of ribs and a second side facing away from said first side;
an elastomeric cover layer;
a tension support layer interposed between said cover layer and said second side;
said ribs having an outer coating thereon and said outer coating being tightly joined to said base body;
said outer coating being an elastomeric layer having a layer thickness of 0.15 to 0.25 mm; and,
said elastomeric layer being based on an interlaced rubber and containing at least fibers in combination with one of the following: a fluoropolymer powder, a powder of a non-ferrous metal and both of said fluoropolymer powder and said non-ferrous metal.

2. The ribbed V-belt of claim 1, wherein said layer thickness of said coating is 0.18 to 0.22 mm.

3. The ribbed V-belt of claim 1, wherein said fiber component in said outer coating is 20 to 100 parts by weight per 100 parts by weight of rubber.

4. The ribbed V-belt of claim 1, wherein said fibers are polyimide fibers.

5. The ribbed V-belt of claim 1, wherein the component of said fluoropolymer powder in said outer coating is 10 to 100 parts by weight per 100 parts by weight of rubber.

6. The ribbed V-belt of claim 1, wherein the component of said fluoropolymer powder in said outer coating is more than 50 parts by weight per 100 parts by weight of rubber.

7. The ribbed V-belt of claim 1, wherein the component of said powder of a non-ferrous metal in said outer coating is 50 to 100 parts by weight per 100 parts by weight of rubber.

8. The ribbed V-belt of claim 1, wherein the particles of said powder of non-ferrous metal are ball, shaped, platelet-shaped or star-shaped and have a mean particle diameter of 10 to 80 µm.

9. The ribbed V-belt of claim 1, wherein said powder of a nonferrous metal is a copper powder.

10. The ribbed V-belt of claim 1, wherein said outer coating differs with respect to color from said base body.

11. The ribbed V-belt of claim 1, wherein said outer coating is based on the same rubber as said elastomeric base body to provide an optimal bonding of said outer coating to said base body.

12. The ribbed V-belt of claim 11, wherein said outer coating and said elastomeric base body are each based on chloroprene rubber (CR).

13. The ribbed V-belt of claim 11, wherein said outer coating and said elastomeric base body are each based on ehtylene-propylene diene rubber (EPDM).

14. The ribbed V-belt of claim 11, wherein said outer coating and said elastomeric base body are each based on hydrated nitrile rubber (HNBR).

15. The ribbed V-belt of claim 11, wherein said outer coating and said elastomeric base body are each based on a mixture of chioroprene rubber (CR), ethylene-propylene diene rubber (EPDM) and hydrated nitrile rubber (HNBR).

16. A ribbed V-belt comprising:
an elastomeric base body having a first side defining a plurality of ribs and a second side facing away from said first side;
an elastomeric cover layer;
a tension support layer interposed between said cover layer and said second side;
said ribs having an outer coating thereon and said outer coating being tightly joined to said base body;
said outer coating being an elastomeric layer having a layer thickness of 0.15 to 0.25 mm;
said elastomeric layer being based on an interlaced rubber and containing at least fibers in combination with one of the following: a fluoropolymer powder, a powder of a non-ferrous metal and both of said fluoropolymer powder and said non-ferrous metal; and,
the particles of said fluoropolymer powder having a mean grain diameter of 2 to 20 µm, a BET surface of 5 to 25 $m^2/g$ and a bulk weight of 100 to 400 g/L.

17. A ribbed V-belt comprising:
an elastomeric base body having a first side defining a plurality of ribs and a second side facing away from said first side;
an elastomeric cover layer;
a tension support layer interposed between said cover layer and said second side;
said ribs having an outer coating thereon and said outer coating being tightly joined to said base body;
said outer coating being an elastomeric layer having a layer thickness of 0.15 to 0.25 mm; and,
said elastomeric layer being based on an interlaced rubber and containing at least fibers in combination with a material selected from the group consisting of a fluoropolymer powder, a powder of a non-ferrous metal and a mixture of said fluoropolyiner powder and said non-ferrous metal.

* * * * *

UNITED STATES PATENT AND TRADEMARK OFFICE
CERTIFICATE OF CORRECTION

| | | |
|---|---|---|
| PATENT NO. | : 7,137,918 B2 | Page 1 of 1 |
| APPLICATION NO. | : 10/656289 | |
| DATED | : November 21, 2006 | |
| INVENTOR(S) | : Tobias Nonnast, Kay Zimmermann and Ymte Greydanus | |

It is certified that error appears in the above-identified patent and that said Letters Patent is hereby corrected as shown below:

In column 5:
Lines 65 to 67: delete "In FIG. 2, the same ribbed V-belt is shown after a brushing operation wherein a portion of the fibers 5 lying on the surface in the outer coating 4 is raised on the ribs." and substitute -- FIG. 2 is a schematic of the cross section of a ribbed V-belt according to the invention wherein the fibers are raised with a brush operation; and, -- therefor.

In column 6:
Line 14: delete "V-belt 1" and substitute -- V-belt -- therefor.

In column 7:
Line 62: delete "ball, shaped," and substitute -- ball-shaped, -- therefor.

In column 8:
Line 22: delete "chioroprene" and substitute -- chloroprene -- therefor.
Line 61: delete "fluoropolyiner" and substitute -- fluoropolymer -- therefor.

Signed and Sealed this

Thirtieth Day of January, 2007

JON W. DUDAS
*Director of the United States Patent and Trademark Office*